United States Patent
Tamiya (10) Patent No.: US 8,484,558 B2
(45) Date of Patent: Jul. 9, 2013

(54) DOCUMENT GENERATION METHOD AND DOCUMENT GENERATION APPARATUS

(75) Inventor: Keisuke Tamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 12/578,840

(22) Filed: Oct. 14, 2009

(65) Prior Publication Data

US 2010/0100812 A1    Apr. 22, 2010

(30) Foreign Application Priority Data

Oct. 20, 2008 (JP) ................................. 2008-270289
Oct. 6, 2009 (JP) ................................. 2009-232869

(51) Int. Cl.
*G06F 17/27* (2006.01)

(52) U.S. Cl.
USPC ........................................................ 715/249

(58) Field of Classification Search
USPC ........................................................ 715/249
See application file for complete search history.

(56) References Cited

U.S. PATENT DOCUMENTS

| | | | | |
|---|---|---|---|---|
| 7,085,999 B2 * | 8/2006 | Maeda et al. | ................. | 715/236 |
| 7,145,676 B2 * | 12/2006 | Fan | ................. | 358/1.15 |
| 2002/0065848 A1 * | 5/2002 | Walker et al. | ................. | 707/511 |
| 2005/0015359 A1 * | 1/2005 | Kidalka et al. | ................. | 707/1 |
| 2009/0164912 A1 * | 6/2009 | Barber et al. | ................. | 715/751 |

FOREIGN PATENT DOCUMENTS

JP      09-284448      10/1997

* cited by examiner

*Primary Examiner* — Doug Hutton
*Assistant Examiner* — Tionna Smith
(74) *Attorney, Agent, or Firm* — Cowan, Liebowitz & Latman, P.C.

(57) ABSTRACT

A document format of an electronic document be generated is designated when a document is read to generate an electronic document of the document, and a division unit for dividing the document in the designated document format is acquired. The document is read based on the acquired division unit, and an electronic document in the designated document format is generated from data of the division unit. The generated electronic document is transmitted to a destination designated in advance.

17 Claims, 13 Drawing Sheets

| DOCUMENT FORMAT | SELECTABLE DIVISION METHOD | TEMPLATE NAME |
|---|---|---|
| SpreadsheetML | LINES | template_line.xlsx |
| WordprocessingML | CHAPTERS | template_section.docx |
| PresentationML | SLIDES | template_slides.pptx |
| ... | ... | ... |

| DOCUMENT FORMAT | SELECTABLE DIVISION METHOD | TEMPLATE NAME |
|---|---|---|
| SpreadsheetML | LINES | template_line.xlsx |
| WordprocessingML | CHAPTERS | template_section.docx |
| PresentationML | SLIDES | template_slides.pptx |
| ... | ... | ... |

| DOCUMENT NUMBER | DESTINATION | GENERATED DOCUMENT NAME |
|---|---|---|
| 1 | bumon_A@example.org | 00000001.xlsx |
| 2 | bumon_B@example.org | 00000002.xlsx |
| ... | ... | ... |

DESIGNATION OF FORMAT AND DESTINATION OF DOCUMENT TO BE GENERATED

FORMAT OF DOCUMENT TO BE OUTPUT: SpreadsheetMLL FORMAT

DIVISION UNIT: 12 LINES

TRANSMISSION METHOD: E-MAIL

DESTINATION:

| DOCUMENT NUMBER | SELECTED ADDRESS |
|---|---|
| 1 | bumon_A@example.org |
| 2 | bumon_B@example.org |
| 3 | ... |
| 4 | ... |

START

| CONVERSION TARGET (1201) | CONSTITUENT ELEMENT AFTER CONVERSION (1202) |
|---|---|
| CHARACTER STRING SURROUNDED BY RECTANGLE | CELLS OF TABLE |
| HORIZONTALLY ARRAYED CELLS | LINES OF TABLE |
| VERTICALLY ARRAYED LINES | TABLE |
| ... | ... |

FIG. 12B

| CONVERSION TARGET (1201) | CONSTITUENT ELEMENT AFTER CONVERSION (1202) |
|---|---|
| A LARGE SIZE CHARACTER STRING STARTED WITH NUMBER | SECTION TITLE |
| CHARACTER STRINGS AND FIGURES SURROUNDED BY SECTION TITLE | SECTION |
| CHARACTER STRING STARTED WITH "·" | BULLETED LIST ITEMS |
| ... | ... |

FIG. 12C

| CONVERSION TARGET (1201) | CONSTITUENT ELEMENT AFTER CONVERSION (1202) |
|---|---|
| CHARACTERS AND FIGURES SURROUNDED BY RECTANGLE | SLIDE |
| CHARACTER STRING AT THE TOP OF SLIDE | SLIDE TITLE |
| ... | ... |

DOCUMENT GENERATION METHOD AND DOCUMENT GENERATION APPARATUS

BACKGROUND OF THE INVENTION

1. Field of the Invention

The present invention relates to a document generation method and a document generation apparatus that read data from a paper document to generate an electronic document.

2. Description of the Related Art

Conventionally, a technique is proposed in which a user uses a multifunction peripheral having a scanner function to read a paper document to generate an electronic document described in a page description language in a PDF format of Adobe or in an XPS format of Microsoft.

A technique is also known in which a generated electronic document is transmitted to a designated device by e-mail (see, for example, Japanese Patent Laid-Open No. 09-284448).

A business printer multifunction peripheral with scanner function has a size division transmission function for dividing a scanned electronic document into appropriate sizes when the size of the document is large.

A page division transmission function is also included for generating a separate electronic document for each page of the document to be scanned and transmitting the documents by e-mail.

In the size division transmission, the electronic document is divided without taking the structure of the electronic document into consideration. Therefore, the document cannot be treated as one electronic document unless the receiving user combines all divided data.

On the other hand, in the page division transmission, each page has an independent electronic document format. Therefore, the receiving user can handle the pages as one electronic document.

However, in the page division transmission, table data, such as a spreadsheet, in which a plurality of pages are included in a document to be scanned, is divided into page-by-page separate electronic documents.

In the table data, the data is logically delimited line-by-line, not page-by-page.

Therefore, the user who has received the electronic documents needs to perform a cumbersome operation, such as using spreadsheet software to open the page-by-page electronic documents and moving the lines to reorganize the documents into meaningful line-by-line separate electronic documents.

SUMMARY OF THE INVENTION

The present invention provides a method and an apparatus capable of transmitting electronic documents divided in an arbitrary division method. As a result, the user can transmit an electronic document to a destination after dividing the electronic document into a unit meaningful for the format of the electronic document. Examples of the unit include not only the sheets of the scanned document, but also rows or columns of a table and sections of the document.

According to one aspect of the present invention, there is provided an electronic document generation method executed in an electronic document generation apparatus, the method comprising: an electronic document format designating step of designating a document format of an electronic document to be generated when a document is read to generate an electronic document of the document; a division unit acquisition step of acquiring a division unit for dividing the document in the document format designated in the electronic document format designating step; a document reading step of reading the document based on the division unit acquired in the division unit acquisition step; an electronic document generation step of generating an electronic document in the designated document format from data of the division unit read in the document reading step; a destination designating step of designating a destination of the electronic document generated in the electronic document generation step; and an electronic document transmission step of transmitting the electronic document to the destination designated in the destination designating step.

According to another aspect of the present invention, there is provided an electronic document generation apparatus comprising: an electronic document format designating unit that designates a document format of an electronic document to be generated when a document is read to generate an electronic document of the document; a division unit acquisition unit that acquires a division unit for dividing the document in the document format designated by the electronic document format designating unit; a document reading unit that reads the document based on the division unit acquired by the division unit acquisition unit; an electronic document generation unit that generates an electronic document in the designated document format from data of the division unit read by the document reading unit; a destination designating unit that designates a destination of the electronic document generated by the electronic document generation unit; and an electronic document transmitting unit that transmits the electronic document to the destination designated by the destination designating unit.

Further features of the present invention will become apparent from the following description of exemplary embodiments (with reference to the attached drawings).

DESCRIPTION OF THE EMBODIMENTS

Exemplary embodiments of the invention will now be described in detail with reference to the drawings.

[First Embodiment]

Figure 1:
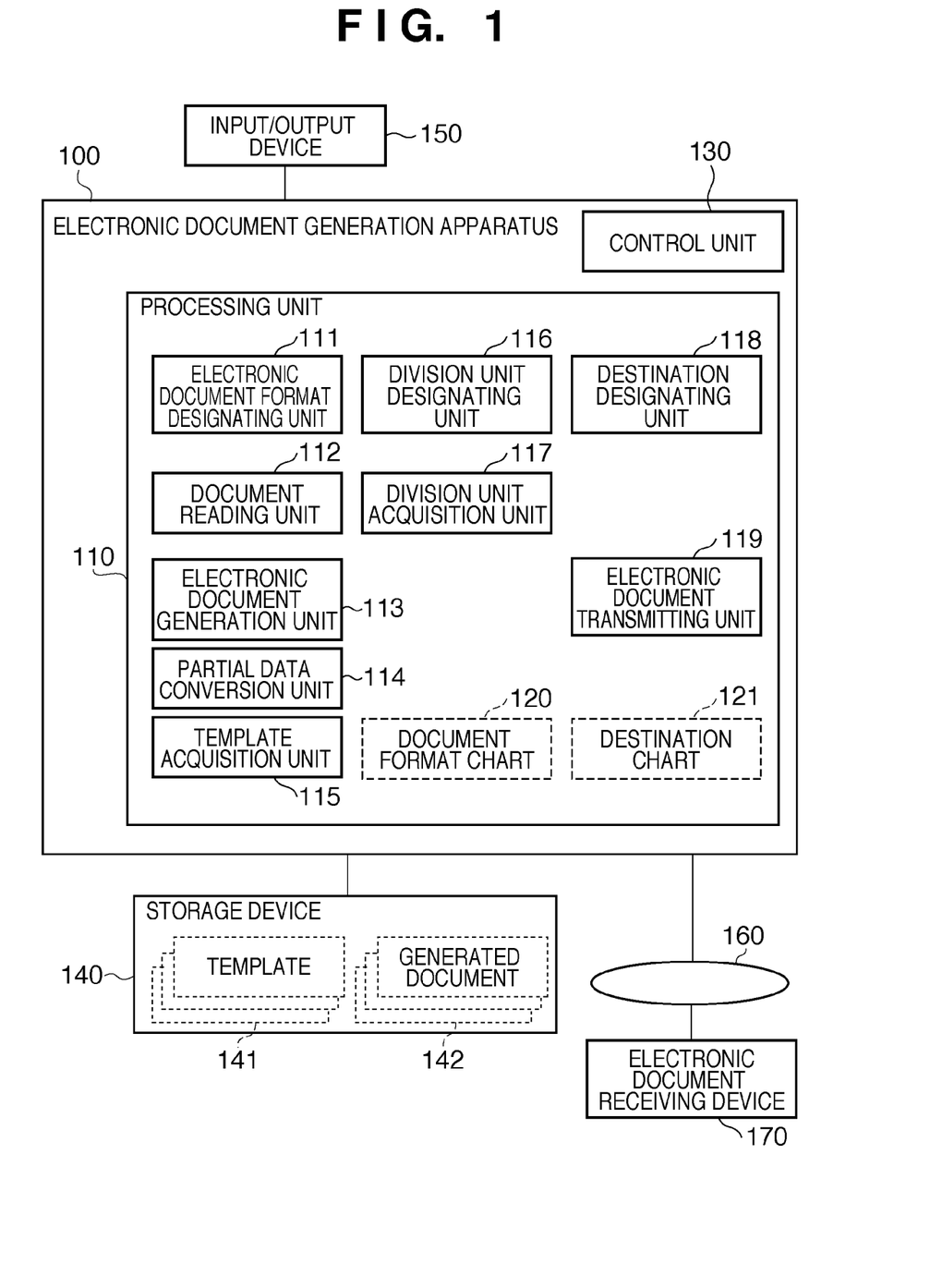
FIG. 1 is a schematic block diagram showing an example of a configuration of an electronic document generation apparatus according to a first embodiment.

FIG. 1 is a schematic block diagram showing an example of a configuration of an electronic document generation apparatus according to a first embodiment. As shown in FIG. 1, an electronic document generation apparatus 100 comprises a processing unit 110 (details will be described later) that executes an electronic document process and a control unit 130. The processing unit 110 is constituted by, for example, hardware and software modules that execute a process according to control by the control unit 130. The control unit 130 is constituted by a CPU, a ROM, a RAM, a peripheral circuit, etc., and controls the processing unit 110. The electronic document generation apparatus 100 is a digital multi-function peripheral having a plurality of functions such as a Scan function and a Universal Send function.

The processing unit 110 includes an electronic document format designating unit 111 that acquires a document format list which can be generated from a document format chart 120 described later and that requests the user of the electronic document generation apparatus 100 to input a document format of the electronic document. The processing unit 110 further includes a document reading unit 112 that reads a paper document based on an instruction of the electronic document format designating unit 111.

The processing unit 110 further includes a partial data conversion unit 114 that converts data of the division unit read by the document reading unit 112 into data in a format of the document to be generated. The processing unit 110 further includes an electronic document generation unit 113 that combines partial data converted by the partial data conversion unit 114 with the template 141 described later of the generated document and that outputs the data as a generated document 142 described later. The processing unit 110 further includes a template acquisition unit 115 that acquires a template 141 corresponding to the format of the electronic document to be generated based on a request from the electronic document generation unit 113.

The processing unit 110 further includes a division unit designating unit 116 from which the user of the electronic document generation apparatus 100 designates the division unit of the document to be read. The processing unit 110 further includes a division unit acquisition unit 117 that acquires dividable units of the document format of the electronic document to be generated based on a request from the division unit designating unit 116.

The processing unit 110 further includes a destination designating unit 118 that requests the user of the electronic document generation apparatus 100 to input the destination of the generated electronic document and that stores the designated destination in a destination chart 121. The processing unit 110 further includes an electronic document transmitting unit 119 that transmits the generated electronic documents to an electronic document receiving device 170 described later.

As shown in FIG. 1, a storage device 140 is connected to the electronic document generation apparatus 100 by cable. The storage device 140 stores the template 141 used in the generation of the electronic document and also stores the generated document 142 generated by the electronic document generation apparatus 100.

Although described as a hard disk, the storage device 140 may be an arbitrary storage medium such as a magnetic disk and an optical disk including a memory card, a CD-ROM, and a DVD.

An input/output device 150 is connected to the electronic document generation apparatus 100 by cable. Examples of the input/output device 150 include not only a touch panel, but also a display, a keyboard, and a mouse. The input/output device 150 can be any device that allows the user of the electronic document generation apparatus 100 to instruct the electronic document generation apparatus 100 to generate an electronic document.

An electronic document receiving device 170 is connected to the electronic document generation apparatus 100 through a network 160 and receives the electronic document generated by the electronic document generation apparatus 100. The electronic document receiving device 170 is, for example, a personal computer (PC) that can execute a document processing application.

Figure 5:
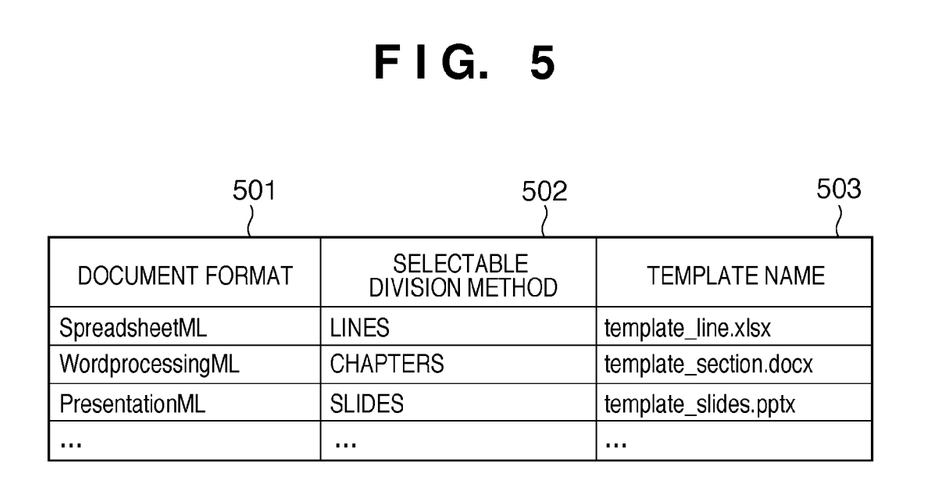
FIG. 5 is a diagram showing a description example of a document format chart 120 according to the first embodiment.

FIG. 5 is a diagram showing a description example of the document format chart 120 according to the first embodiment. The document format chart 120 is constituted by fields of a document format 501 of electronic document that can be generated, a division method 502 of document that can be selected in the document format, and a template name 503 used for generating an electronic document.

FIG. 5 describes an example in which a SpreadsheetML format, a WordprocessingML format, and a PresentationML format whose specifications are defined by ECMA-376 can be selected as a document format.

In the described example, lines, sections, and slides of presentation can be selected as a division unit upon the selection of the format.

In the example, although only one selectable division method 502 is registered for the document format 501, a plurality of division units may be registered.

Figure 6:
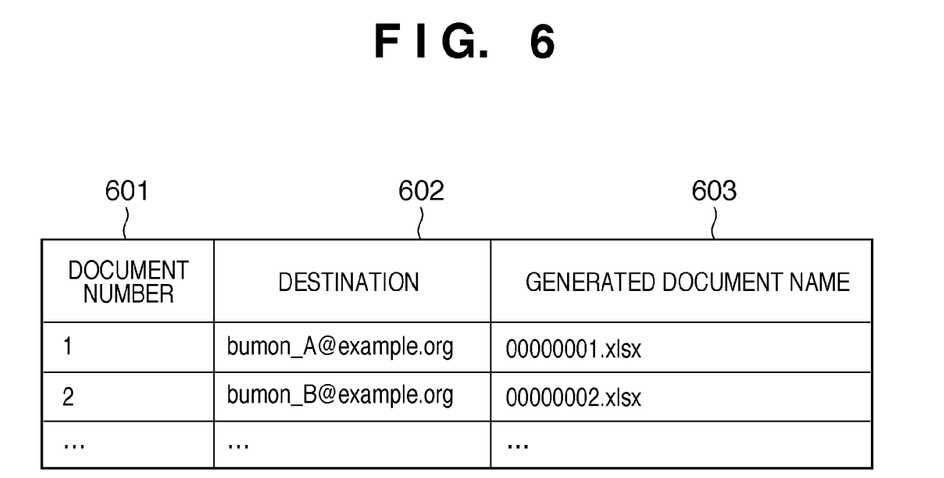
FIG. 6 is a diagram showing a description example of a destination chart 121 according to the first embodiment.

FIG. 6 is a diagram showing a description example of the destination chart 121 according to the first embodiment. The destination chart 121 is constituted by fields of a document number 601 indicating the order of documents to be generated, a destination 602 indicating e-mail addresses of the destinations of the electronic documents, and a generated document name 603 indicating names of the generated electronic documents.

In the example, bumon_A@example.org is designated to the destination 602 of the document number 601 "1", and the generated document name 603 00000001.xlsx is stored in the storage device 140.

Figure 7:
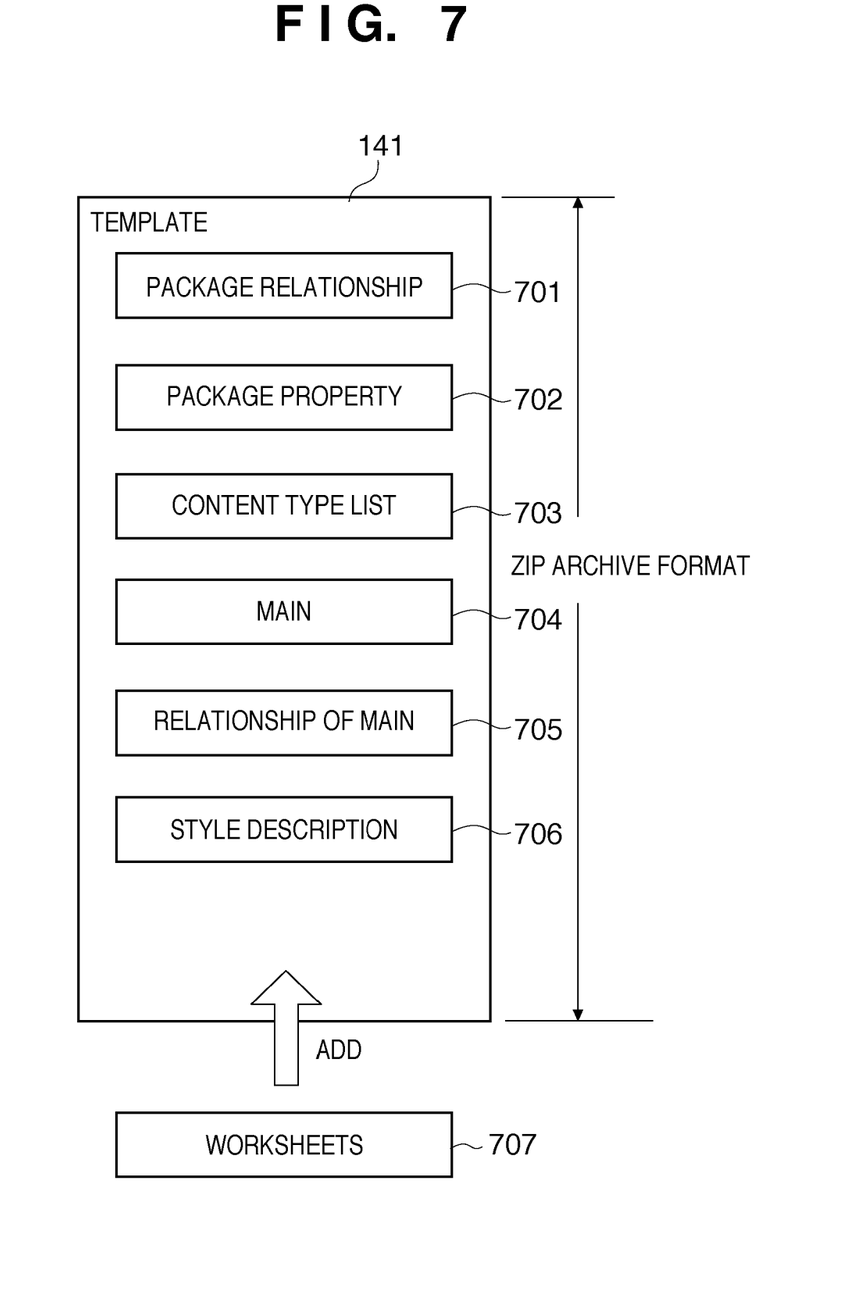
FIG. 7 is a diagram showing a configuration example of a template 141 according to the first embodiment.

FIG. 7 is a diagram showing a configuration example of the template 141 according to the first embodiment. The example is a description example of a SpreadsheetML format which is a table data description document format of Office Open XML File Formats whose specifications are defined in ECMA-376.

In the SpreadsheetML format, a plurality of data units in the document called parts is packaged by a zip archive. The parts are classified into the following types.

A package relationship 701 is a part describing a list of main parts of package, such as a package property and a main described below. A package property 702 is a part describing attributes of document such as title and creation date/time of document. A content type list 703 is a part describing part types of the parts.

A main 704 is a part describing a list of worksheets 707 described below. A relationship of main 705 is a part describing the worksheets 707 related to the main 704 and the name of a style description 706. The style description 706 is a part describing the field size, the font type, and the color upon the display of a table. The worksheet 707 is a part for describing the data in the table.

In the example, the template for SpreadsheetML is constituted by the parts 701 to 706, excluding the worksheets 707 generated from the data read from the paper document. However, the template 141 may have a configuration other than the configuration shown in FIG. 7 depending on the format of the document to be generated and the division unit.

Figure 8:
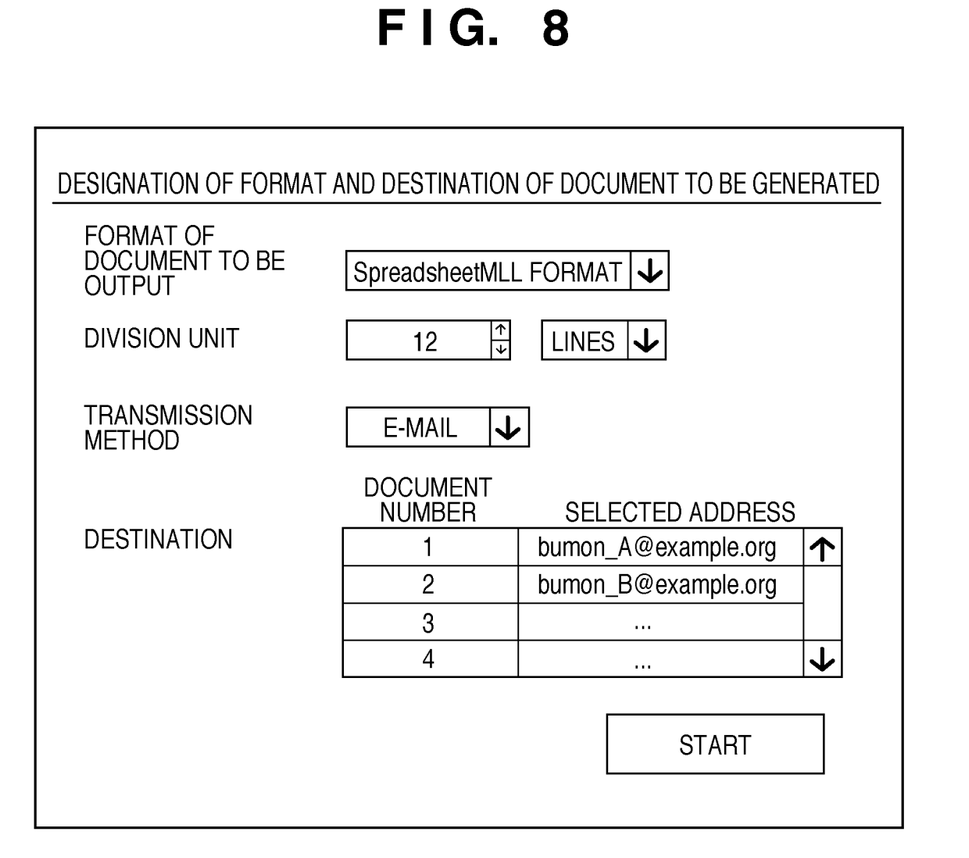
FIG. 8 is a diagram showing a setting screen example according to the first embodiment.

FIG. 8 is a diagram showing a setting screen example according to the first embodiment. The screen is a user interface screen of the input/output device 150, and the user of the electronic document generation apparatus 100 designates generation and transmission setting to the electronic document format designating unit 111, the division unit designating unit 116, and the destination designating unit 118. From the screen, the user can designate the format, the division unit, the transmission method, and the destination of the electronic document to be output.

An electronic document transmission process will be described with reference to FIG. 2, in which the user of the electronic document generation apparatus 100 in the foregoing configuration transmits a generated electronic document.

Figure 2:
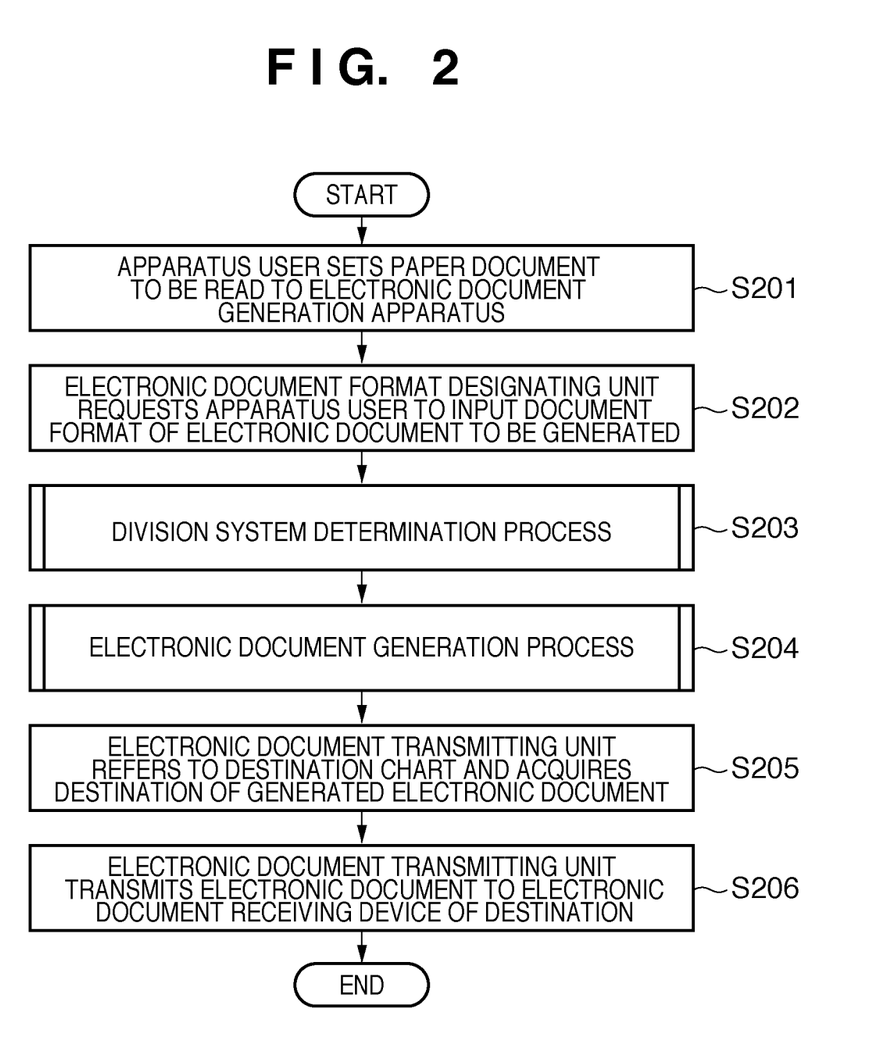
FIG. 2 is a flow chart showing an electronic document transmission process according to the first embodiment.

FIG. 2 is a flow chart showing an electronic document transmission process according to the first embodiment. The user of the electronic document generation apparatus 100 first sets a paper document to be read to the electronic document generation apparatus 100 (S201). The electronic document format designating unit 111 then presents the setting screen shown in FIG. 8 to the user of the electronic document generation apparatus 100 and requests the user to input the document format of the electronic document to be generated (S202).

When the user inputs the document format of the electronic document, a division system indicating with which unit the electronic document will be read to generate an electronic document is determined in a division system determination process (S203). At the same time, the destinations of the electronic documents are stored in the destination chart 121 in the division system determination process (S203).

When the division system is determined, the electronic document is actually generated in an electronic document generation process (S204). After the electronic document is generated, the electronic document transmitting unit 119 refers to the destination chart 121 and acquires the destination of the generated electronic document (S205). The electronic document transmitting unit 119 then transmits the electronic document to the acquired destination by e-mail (S206).

Although an example of transmitting the electronic document by e-mail is described, the file may be transferred based on prescribed protocols such as FTP and HTTP or with other methods.

A detailed process of the division system determination process (S203 shown in FIG. 2) will now be described with reference to FIG. 3.

Figure 3:
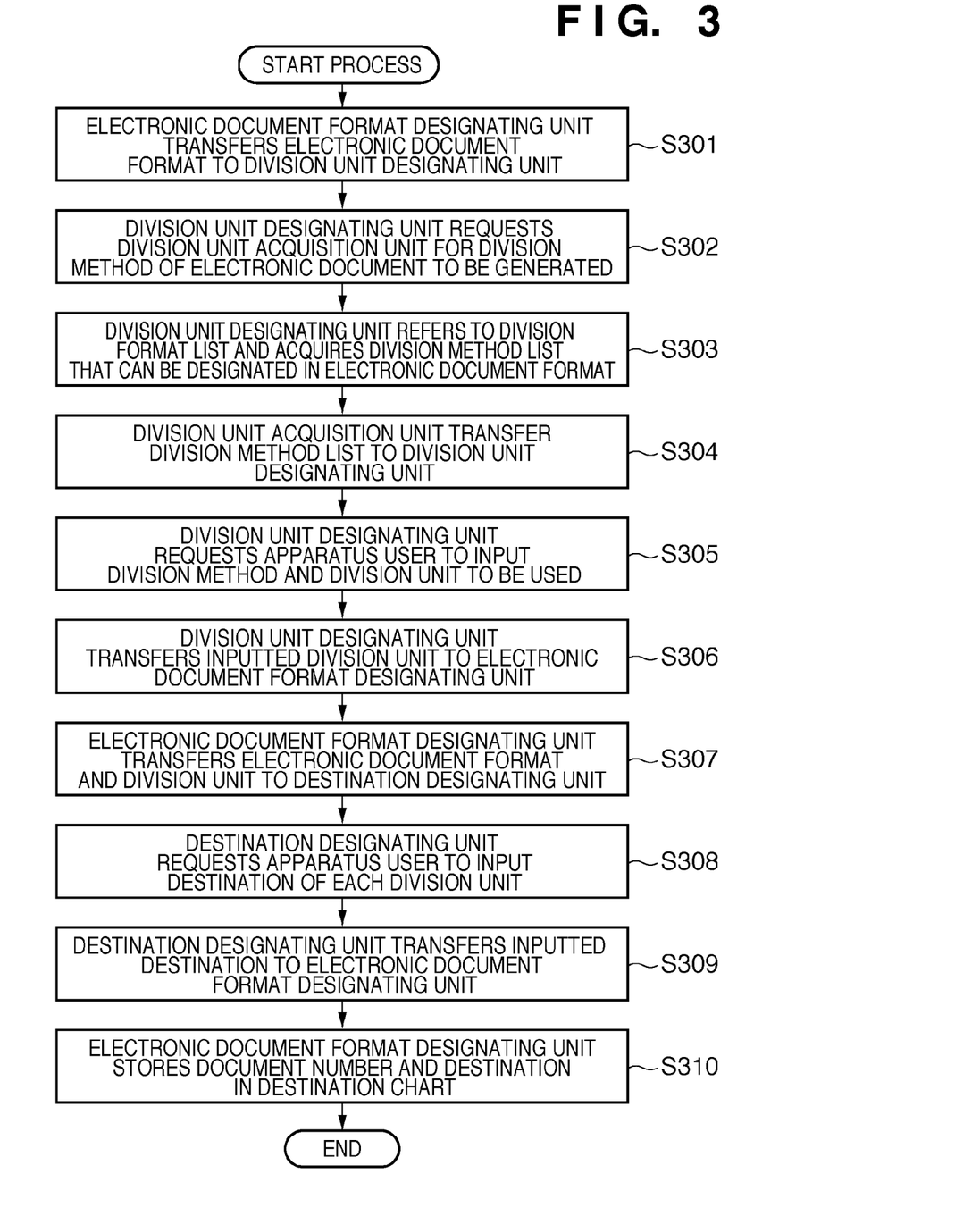
FIG. 3 is a flow chart showing a detailed process of a division system determination process according to the first embodiment.

FIG. 3 is a flow chart showing a detailed process of a division system determination process according to the first embodiment. The electronic document format designating unit 111 first transfers the document format of the electronic document to be generated to the division unit designating unit 116 (S301). After receiving the document format, the division unit designating unit 116 requests the division unit acquisition unit 117 for dividable units in the designated document format (S302). After receiving the request of the dividable units, the division unit acquisition unit 117 refers to the document format chart 120 and reads the selectable division methods 502 corresponding to the document format 501 (S303).

After reading the selectable division methods 502, the division unit acquisition unit 117 transfers the list of the division methods 502 to the division unit designating unit 116 (S304). Meanwhile, the division unit designating unit 116 displays the list of the received division methods on the screen and requests the user of the electronic document generation apparatus 100 to input the division method and the division unit (S305). In the screen example shown in FIG. 8, "Lines" is input as the division method and "12" lines are input as the division unit.

The division unit designating unit 116 then transfers the inputted division unit to the electronic document format designating unit 111 (S306).

After receiving the division unit, the electronic document format designating unit 111 transfers the electronic document format and the division unit to the destination designating unit 118 (S307). Meanwhile, after receiving the division unit, the destination designating unit 118 requests the user to input the destination for each division unit on the screen shown in FIG. 8 (S308). In the screen example shown in FIG. 8, an e-mail transmission address is designated for each division unit.

The destination designating unit 118 transfers the inputted destinations to the electronic document format designating unit 111 (S309). Lastly, the electronic document format designating unit 111 stores the received destinations of the document unit in the destination chart 121 (S310).

At this point, the sequential numbers are stored in the document number 601 of the destination chart shown in FIG. 6, and the e-mail transmission addresses are stored in the destination 602. However, the generated document name 603 is blank.

A detailed process of the electronic document generation process (S204 shown in FIG. 2) will now be described with reference to FIGS. 4A and 4B.

Figure 4A:
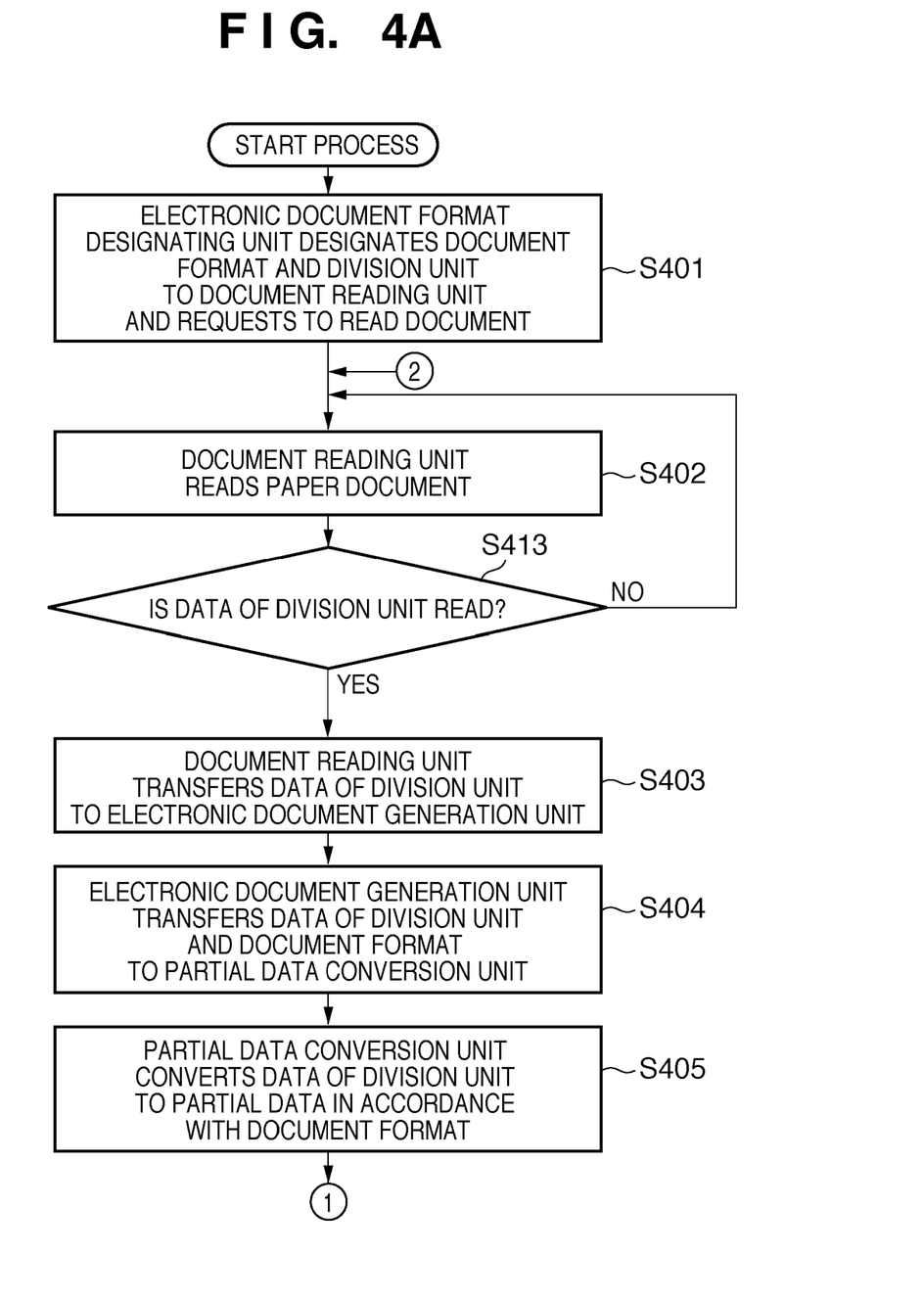
FIGS. 4A and 4B are a flow chart showing a detailed process of an electronic document generation process according to the first embodiment.
Figure 4B:
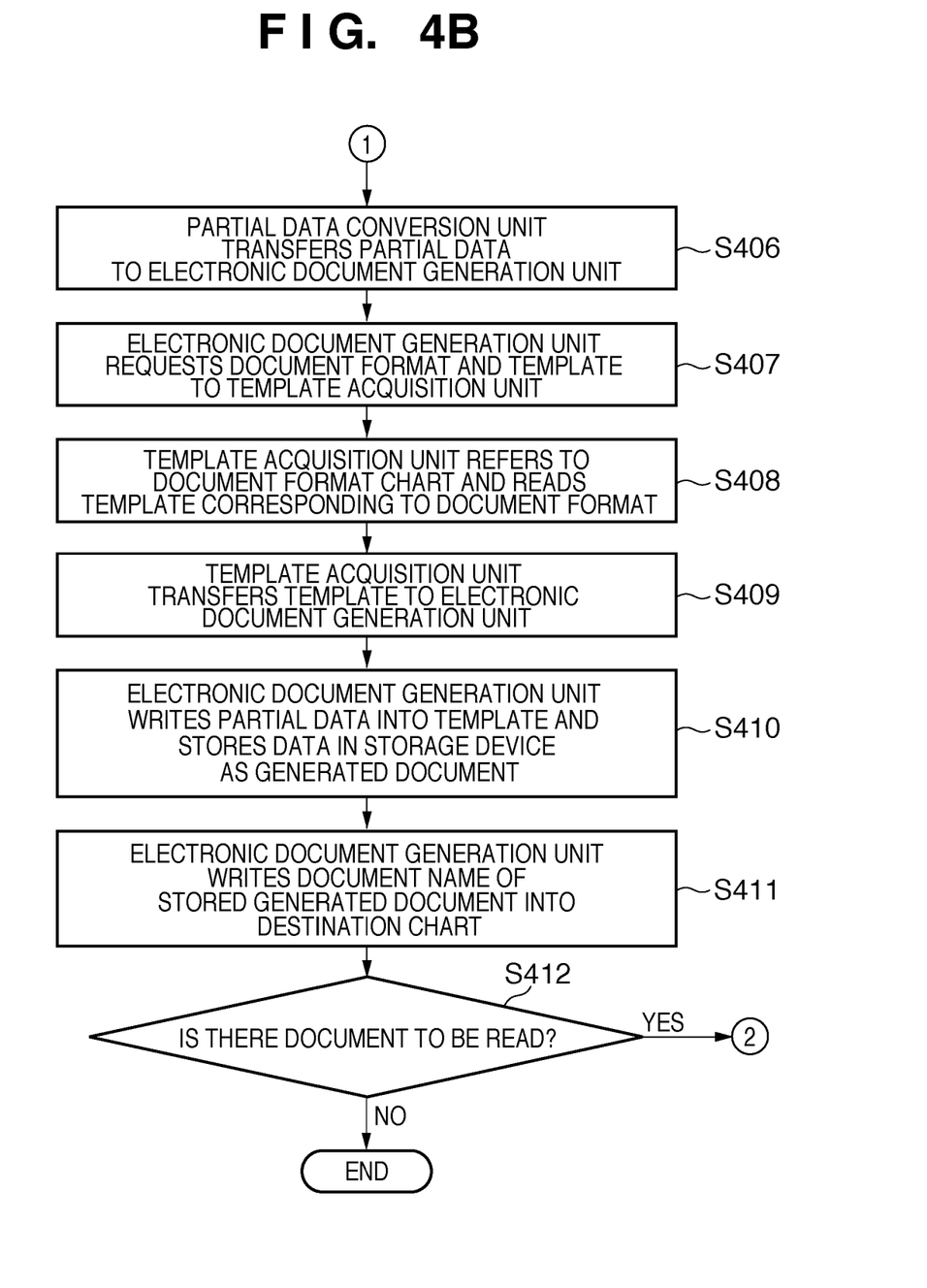

FIGS. 4A and 4B are flow charts showing a detailed process of an electronic document generation process according to the first embodiment. The electronic document format designating unit 111 designates the document format and the division unit to the document reading unit 112 and requests to read the paper document to be read (S401). Meanwhile, after receiving the request, the document reading unit 112 executes a paper document reading process (S402) and reads data of the division unit (S413). The process then proceeds.

In the screen example shown in FIG. 8, 12 lines are designated as the division unit. Therefore, when the total of the logical unit counter received as a result of the paper document reading process indicates 12 lines, the data is read, and the document data received from the paper document process reading process is held as data of the division unit. The process then proceeds.

The document reading unit 112 transfers the read data of the division unit to the electronic document generation unit 113 (S403). Meanwhile, the electronic document generation unit 113 transfers the data of the division unit and the document format of the electronic document to the partial data conversion unit 114 (S404). After receiving the data of the division unit, the partial data conversion unit 114 converts the data of the division unit into partial data, which is part of the electronic document in the designated document format (S405).

The designated document format is SpreadsheetML in the example described in the first embodiment. Therefore, the partial data of the conversion result is equivalent to the worksheets 707 defined by the Office Open XML specifications. The worksheets 707 are XML format data and are described with, for example, row elements expressing the rows and col elements expressing the columns.

Although the worksheet parts of SpreadsheetML are used as the partial parts in the description, similar processes are also executed for other document formats except that partial data corresponding to the document format is generated.

The partial data conversion unit 114 then transfers the partial data of the conversion result to the electronic document generation unit 113 (S406). Meanwhile, after receiving the partial data, the electronic document generation unit 113 designates the document format and requests the template acquisition unit 115 for the template name of the template 141 used in the generation of the electronic document (S407).

After receiving the request, the template acquisition unit 115 refers to the document format chart 120 and acquires the template name of the template corresponding to the designated document format. The template acquisition unit 115 further reads out the template 141 corresponding to the template name from the storage device 140 (S408). The read template 141 is transferred to the electronic document generation unit 113 (S409).

In the example, the template (FIG. 7) in which the document format is SpreadsheetML is transferred to the electronic document generation unit 113.

In this way, the electronic document generation unit 113 adds the partial data received from the partial data conversion unit 114 to the template, the data serving as the worksheets 707 of SpreadsheetML. The electronic document generation unit 113 then stores the data of the combined results in the storage device 140 as a generated document (S410).

After storing the generated document, the electronic document generation unit 113 writes the document name of the generated document into the field of the generated document name 603 of the destination chart 121 (S411). The above processes in S402 to S411 are repeated if there is a document to be read (S412).

In the example described in the first embodiment, the template is used to generate the entire document from the partial data. However, the document can be similarly generated without using the template.

A detailed process of the paper document reading process (S402 shown in FIG. 4A) will now be described with reference to FIGS. 11 and 12.

Figure 11:
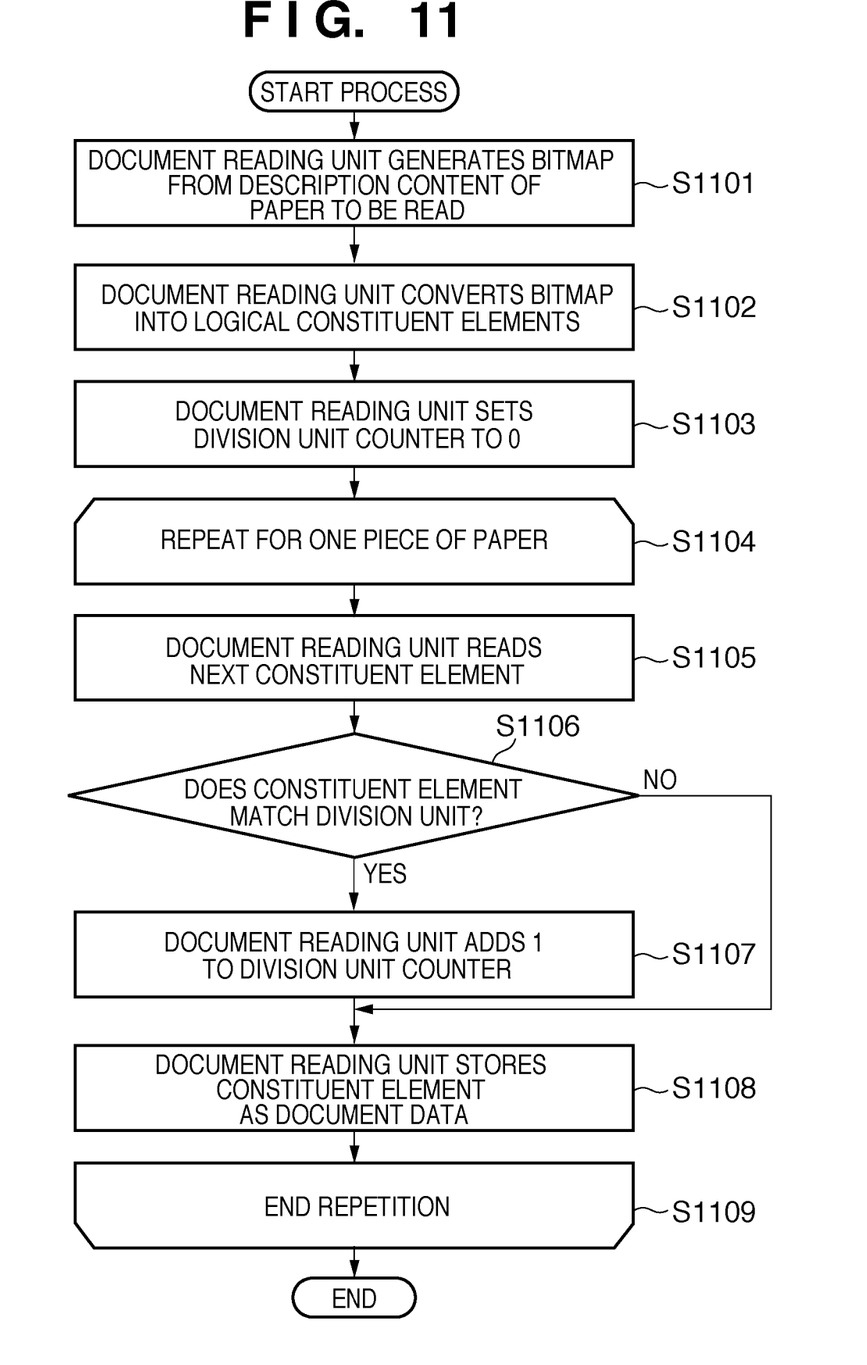
FIG. 11 is a flow chart showing a paper document reading process according to the first embodiment.

FIG. 11 is a flow chart showing a flow of a detailed process of a paper document reading process according to the first embodiment.

The document reading unit 112 first generates a bitmap image from the description content of the paper to be read (S1101).

The document reading unit 112 uses an OCR function, a figure recognition function, a table recognition function, etc., to convert the bitmap image into logical constituent elements of document constituting the document formats (S1102). The constituent elements hold coordinate data on the paper.

Figure 12A:
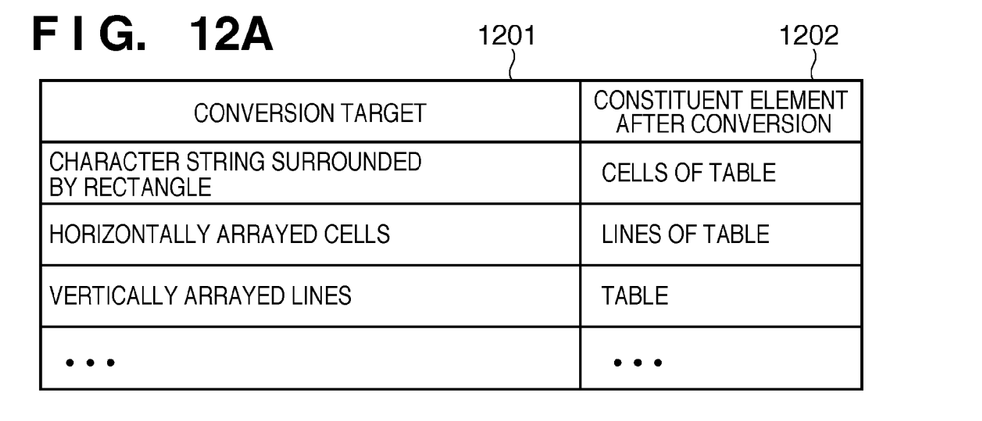
FIGS. 12A to 12C are examples of document format conversion rules according to the first embodiment.
Figure 12B:
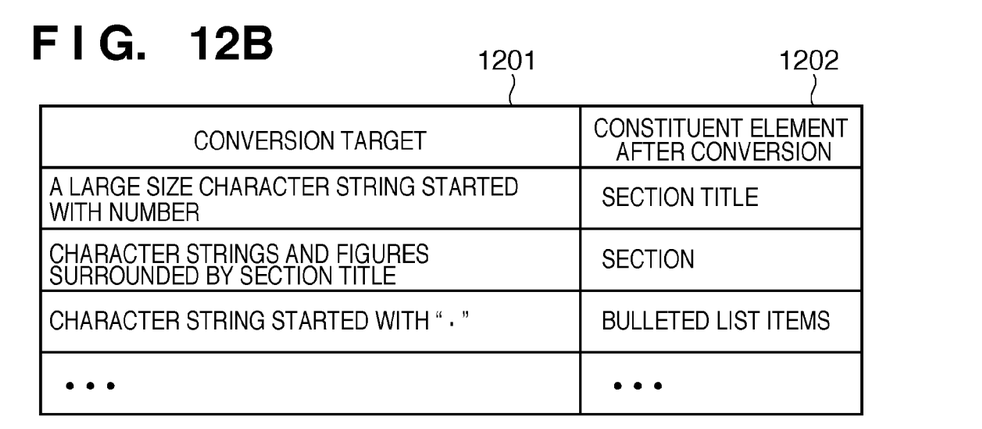
Figure 12C:
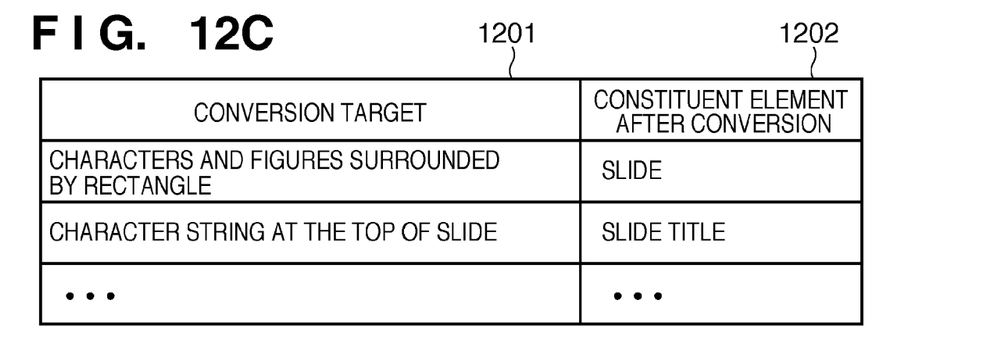

FIGS. 12A to 12C are examples of document format conversion rules describing what kind of conversion rule is used in each document format.

FIGS. 12A to 12C show an example of conversion rules in which the document formats are SpreadsheetML, WordprocessingML, and PresentationML, respectively.

The field of a conversion target 1201 indicates data to be converted, and the field of a constituent element after conversion 1202 indicates data after conversion. The conversions are already realized by commercially available OCR software, etc., and the data does not have to be converted as shown in this example.

The document reading unit 112 initializes the division unit counter to 0 (S1103), reads the conversion result from the top, and repeats the processes from S1105 to S1108 (S1104 and S1109). The document reading unit 112 sequentially reads the following constituent elements from the top in the vertical direction (S1105). If the read constituent element matches the division unit, the document reading unit 112 adds 1 to the division unit counter (S1107). The document reading unit 112 stores the constituent element in a storage device such as a memory as document data (S1108). Lines are designated as the division unit in the screen example shown in FIG. 8. Therefore, the division unit counter counts the number of lines.

[Second Embodiment]

A second embodiment according to the present invention will now be described in detail with reference to the drawings. In the second embodiment, the division unit designated by the division unit designating unit 116 of the electronic document generation apparatus 100 described in the first embodiment can be designated under the condition of the values of the read data.

Figure 10:
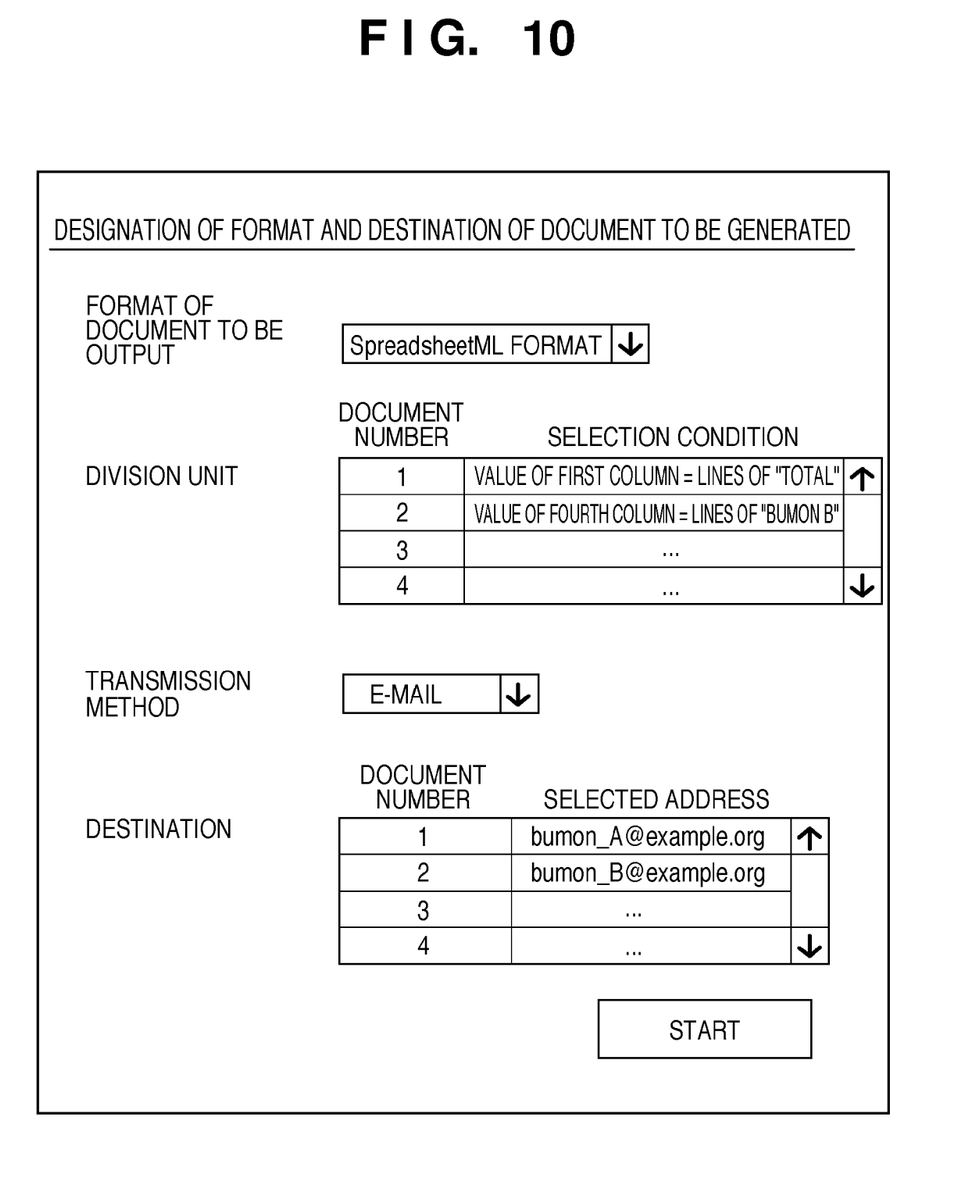
FIG. 10 is a diagram showing a setting screen example according to the second embodiment.

FIG. 10 is a diagram showing a setting screen example according to the second embodiment. The screen is presented when the user uses the electronic document format designating unit 111, the division unit designating unit 116, and the destination designating unit 118 to designate the document format, the division unit, and the destination of the electronic document.

Consequently, in the configuration of the electronic document generation apparatus 100 according to the second embodiment, a division condition determination unit is added to the configuration of the first embodiment shown in FIG. 1.

The detailed processes of the electronic document transmission process (FIG. 2) and the division format determination process (FIG. 3) are the same as the first embodiment. However, as the division condition determination unit is added, a determination process is added to the electronic document generation process 204 as shown in FIGS. 9A and 9B.

Figure 9A:
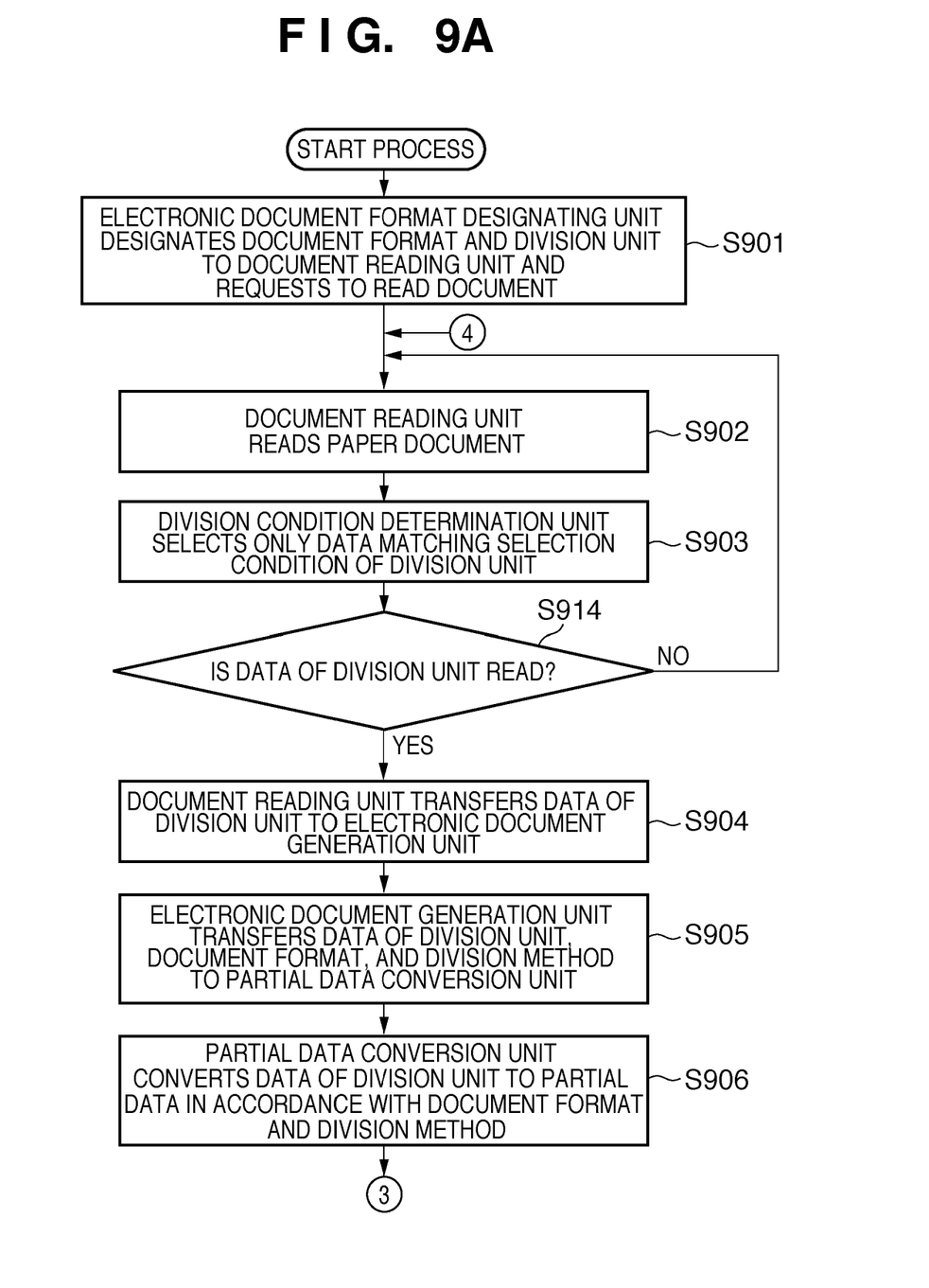
FIGS. 9A and 9B are flow charts showing a detailed process of an electronic document generation process according to a second embodiment.
Figure 9B:
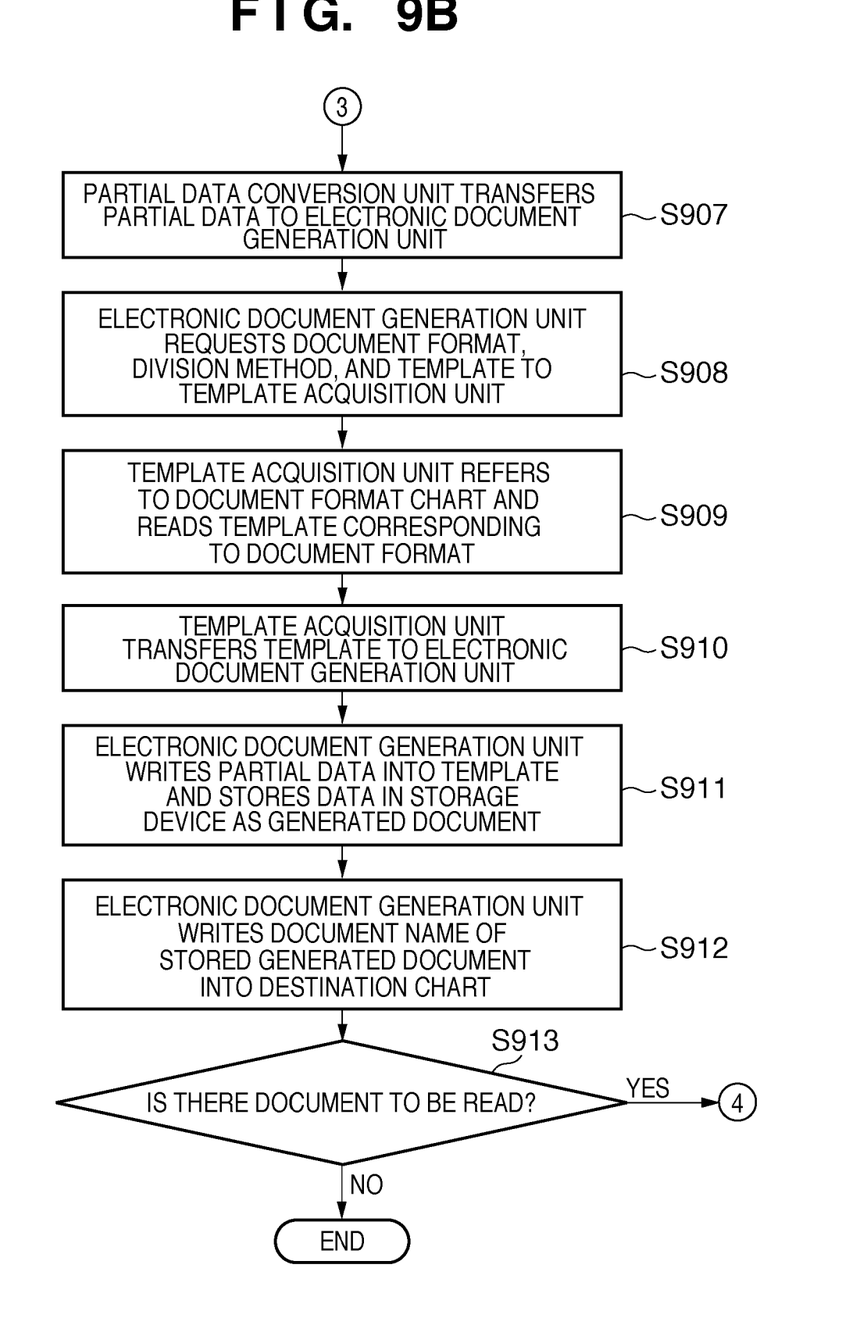

FIGS. 9A and 9B are flow charts showing a detailed process of an electronic document generation process according to the second embodiment. In S903 shown in FIG. 9A, the division condition determination unit transfers only data, among the data read by the document reading unit 112, that matches the selection condition designated by the apparatus user on the setting screen shown in FIG. 10 to the electronic document generation unit 113, the data serving as a division unit.

Other processes (S901, S902, S914 and S904 to S913) are the same as the detailed process of the electronic document generation process of the first embodiment (FIGS. 4A and 4B) except for the division method added in S905, S906 and S908, and the description will not be repeated.

In the second embedment, as shown in FIG. 10, values of columns of a table are designated as selection conditions of the division unit. The selection conditions can be designated in accordance with the read data. For example, the names of the sections can be designated if the document format of the document to be generated is WordprocessingML, and the titles of the slides can be designated in case of PresentationML.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-270289,filed Oct. 20, 2008 and 2009-232869,filed Oct. 6, 2009, which are hereby incorporated by reference herein in their entirety.

What is claimed is:

1. An electronic document generation method executed in an electronic document generation apparatus, the method comprising:
    designating a document format;
    requesting from the user, a division condition, wherein the division condition includes values of the columns of the table, names of sections of the document, and titles of the slides of the presentation;
    reading data from a paper document;
    dividing the document in the designated format;
    selecting data matching the division condition;
    generating an electronic document in the designated format;
    designating a destination of the electronic document;
    transmitting the electronic document to the designated destination.

2. The method according to claim 1, wherein the division unit is requested by a user.

3. The method according to claim 1, further comprising requesting a user to input a destination of the electronic document.

4. The method according to claim 1, further comprising acquiring a template of the designated document format, wherein the data of the division unit is added to the template to generate the electronic document.

5. The method according to claim 1, wherein the division unit includes rows of a table, sections of a document, and slides of a presentation.

6. The method according to claim 1, wherein e-mail, file transfer, and a prescribed protocol are used to transmit the electronic document.

7. An electronic document generation apparatus comprising:
    at least one processor executing a program recorded on a memory device operable to:
        designating a document format;
        requesting from the user, a division condition, wherein the division condition includes values of the columns of the table, names of sections of the document, and titles of the slides of the presentation;
        reading data from a paper document;
        dividing the document in the designated format;
        selecting data matching the division condition;
        generating an electronic document in the designated format;
        designating a destination of the electronic document;
        transmitting the electronic document to the designated destination.

8. A program recorded in a non-transitory computer-readable recording medium, the program causing a computer to execute the document generation method according to claim 1.

9. An electronic document generation method executed in an electronic document generation apparatus, the method comprising:
    selecting a document format, from a plurality of formats, indicating divisible units within each format;
    using a document format chart, corresponding to the selected document format, to determine the divisible units of the document, wherein the chart comprises the plurality of document formats and a plurality of components each of which correspond to one of the document formats;
    reading data from a paper document;
    dividing the document in the determined divisible units of the document;
    generating an electronic document in the designated format;
    transmitting the electronic document.

10. The method according to claim 9, wherein the plurality of document formats includes at least any two of a tabular format, a text document format and a presentation format.

11. The method according to claim 10, wherein the divisible unit is any one of the line of a table, the chapter of a text document and the slide of a presentation.

12. The method according to claim 9, wherein the chart, corresponding to one document chart, describes a plurality of selectable divisible units.

13. An electronic document generation apparatus, comprising:
    a processor executing a program recorded on a memory device operable to:
        selecting a document format, from a plurality of formats, indicating divisible units within each format;
        using a document format chart, corresponding to the selected document format, to determine the divisible units of the document, wherein the chart comprises the plurality of document formats and a plurality of components each of which correspond to one of the document formats;
        reading data from a paper document;
        dividing the document in the determined divisible units of the document;
        generating an electronic document in the designated format;
        transmitting the electronic document.

14. The apparatus according to claim 13, wherein the plurality of document formats includes at least any two of a tabular format, a text document format and a presentation format.

15. The apparatus according to claim 13, wherein the divisible unit is any one of the line of a table, the chapter of a text document and the slide of a presentation.

16. The apparatus according to claim 13, wherein the chart, corresponding to one document chart, describes a plurality of selectable divisible units.

17. A program recorded in a non-transitory computer-readable recording medium, the program causing a computer to execute the document generation method according to claim 13.

* * * * *